United States Patent
Lewis et al.

(10) Patent No.: US 11,359,551 B2
(45) Date of Patent: Jun. 14, 2022

(54) SECONDARY FLOW LOCKOUT VALVE

(71) Applicant: HONEYWELL INTERNATIONAL INC., Morris Plains, NJ (US)

(72) Inventors: Steven A. Lewis, South Bend, IN (US); Gary Valencourt, Niles, MI (US); Paul Futa, North Liberty, IN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 108 days.

(21) Appl. No.: 15/930,218

(22) Filed: May 12, 2020

(65) Prior Publication Data

US 2021/0355882 A1   Nov. 18, 2021

(51) Int. Cl.
| | |
|---|---|
| *F02C 7/00* | (2006.01) |
| *F02C 9/26* | (2006.01) |
| *F02C 7/232* | (2006.01) |
| *F02C 7/26* | (2006.01) |
| *F16K 11/07* | (2006.01) |

(52) U.S. Cl.
CPC .............. *F02C 9/263* (2013.01); *F02C 7/232* (2013.01); *F02C 7/26* (2013.01); *F16K 11/0716* (2013.01)

(58) Field of Classification Search
CPC ...... F02C 9/263; F02C 7/232; F16K 11/0716; G05D 16/101; Y10T 137/2605; Y10T 137/2663
See application file for complete search history.

(56) References Cited

U.S. PATENT DOCUMENTS

| | | | |
|---|---|---|---|
| 6,135,135 A * | 10/2000 | Futa, Jr. .................. | F02C 7/232 137/115.03 |
| 7,252,068 B2 | 8/2007 | Eick et al. | |
| 2006/0021324 A1 | 2/2006 | Eick et al. | |
| 2010/0037612 A1* | 2/2010 | Futa ........................ | F02C 7/228 60/734 |
| 2015/0096301 A1 | 4/2015 | Chabaille et al. | |
| 2016/0017808 A1 | 1/2016 | Chabaille et al. | |

* cited by examiner

*Primary Examiner* — Katheryn A Malatek
(74) *Attorney, Agent, or Firm* — Lorenz & Kopf, LLP

(57) ABSTRACT

A fuel system for a gas turbine engine includes a secondary flow lockout valve. The secondary flow lockout valve includes a valve body having a first end that defines an inlet and a second end. The valve body includes at least one primary outlet bore and at least one secondary outlet bore. The valve body defines a channel in fluid communication with the primary outlet bore. The secondary flow lockout valve includes a cover that cooperates with the second end of the valve body to define a chamber. The chamber is in fluid communication with the channel such that the valve body is movable between at least a first position in which the primary outlet bore is open and a second position in which both the primary outlet bore and the secondary outlet bore are open based on a pressure in the chamber.

20 Claims, 8 Drawing Sheets

SECONDARY FLOW LOCKOUT VALVE

TECHNICAL FIELD

The present disclosure generally relates to gas turbine engines, and more particularly relates to a secondary flow lockout valve that regulates a primary flow of a fluid to a gas turbine engine.

BACKGROUND

Gas turbine engines may be employed to power various devices. For example, a gas turbine engine may be employed to power a vehicle, such as an aircraft. Generally, gas turbine engines combust fuel supplied by a fuel supply system to drive a turbine to generate power to propel the aircraft. The fuel supply system includes a fuel pump that supplies fuel from a source to the gas turbine engine and to other systems associated with the aircraft. Due to weight and size requirements, the fuel pump may be sized to provide fuel to the gas turbine engine and other systems associated with the aircraft during normal operating conditions at higher engine speeds. During a start-up of the gas turbine engine, a large volume of fuel is generally needed to bring the gas turbine engine up to a higher engine speed, such as greater than about 25% engine speed. Due to the output capacity of the fuel pump, the flow output at start-up may not be sufficient to supply the gas turbine engine and the other systems associated with the aircraft with fuel.

Accordingly, it is desirable to provide a secondary flow lockout valve that regulates a primary flow a fluid, such as fuel, to a gas turbine engine. In particular, it is desirable to provide a secondary flow lockout valve that prioritizes the primary fuel flow to the gas turbine engine over a secondary fuel flow to ensure that the gas turbine engine has sufficient fuel flow at start-up and lower engine speeds. Furthermore, other desirable features and characteristics of the present invention will become apparent from the subsequent detailed description and the appended claims, taken in conjunction with the accompanying drawings and the foregoing technical field and background.

SUMMARY

According to various embodiments is a secondary flow lockout valve for a gas turbine engine. The secondary flow lockout valve includes a valve body having a first end that defines an inlet configured to receive a fluid and a second end. The valve body includes at least one primary outlet bore and at least one secondary outlet bore defined between the first end and the second end. The valve body defines a channel in fluid communication with the at least one primary outlet bore. The secondary flow lockout valve includes a cover that cooperates with the second end of the valve body to define a chamber. The chamber is in fluid communication with the channel such that the valve body is movable between at least a first position in which the at least one primary outlet bore is open and a second position in which both the at least one primary outlet bore and the at least one secondary outlet bore are open based on a pressure in the chamber.

The secondary flow lockout valve includes a biasing member disposed in the chamber, and the biasing member biases the valve body in the first position. The secondary flow lockout valve includes a valve sleeve coupled to the cover, the valve body received within the valve sleeve, and the valve body is movable relative to the valve sleeve and the cover based on the pressure in the channel. The secondary flow lockout valve includes a valve housing, the valve sleeve and the cover received within the valve housing, the valve housing defining a housing inlet configured to receive the fluid and in fluid communication with the inlet of the valve body, a housing primary outlet in fluid communication with the at least one primary outlet bore and a housing secondary outlet in fluid communication with the secondary outlet bore based on the position of the valve body. The valve sleeve defines at least one pressure bore, and the at least one pressure bore is in fluid communication with the housing primary outlet based on the position of the valve body. The at least one pressure bore is in fluid communication with the housing primary outlet in the second position. The valve sleeve includes at least one primary sleeve outlet bore in fluid communication with the at least one primary outlet bore, and at least one secondary sleeve outlet bore in fluid communication with the at least one secondary outlet bore based on the position of the valve body. The housing primary outlet has a diameter that is different than the housing secondary outlet. An outer perimeter of the valve sleeve includes a plurality of sealing members spaced apart along the valve sleeve to fluidly isolate the housing primary outlet from the housing secondary outlet. An outer perimeter of the valve body defines a primary outlet manifold and a secondary outlet manifold, and the primary outlet manifold and the secondary outlet manifold comprise channels recessed into the outer perimeter. The valve body includes a fluid chamber in fluid communication with the inlet and an internal wall, the fluid chamber including a first portion and a second portion, the at least one primary outlet bore defined in the first portion, the at least one secondary outlet bore defined in the second portion, and the internal wall extends radially into the second portion such that the second portion has a second diameter that is different than a first diameter of the first portion. The channel is defined in the internal wall. The channel is in fluid communication with the at least one primary outlet bore via a single pressure inlet bore defined through the valve body, and the pressure inlet bore is configured to provide restrictive fluid flow damping to the chamber. The secondary flow lockout valve includes at least one force adjusting shim coupled to the cover to adjust a force applied by the biasing member.

Further provided is a fuel system for a gas turbine engine. The fuel system includes fuel pump configured to provide a fuel, and a secondary flow lockout valve downstream from the fuel pump. The secondary flow lockout valve includes a valve sleeve that defines at least one primary sleeve outlet bore and at least one secondary sleeve outlet bore downstream from the at least one primary sleeve outlet bore. The secondary flow lockout valve includes a valve body movable within the valve sleeve. The valve body has a first end that defines an inlet configured to receive the fuel and a second end. The valve body includes at least one primary outlet bore downstream from at least one secondary outlet bore, and the valve body defines a channel in fluid communication with the at least one primary outlet bore. The secondary flow lockout valve includes a cover coupled to the valve sleeve that cooperates with the second end of the valve body to define a chamber. The valve body is movable relative to the cover. The chamber is in fluid communication with the channel such that the valve body is movable relative to the valve sleeve and the cover between at least a first position in which the at least one primary outlet bore is open and a second position in which both the at least one primary outlet bore and the at least one secondary outlet bore are open based on a pressure in the chamber.

The fuel system includes a biasing member disposed in the chamber, and the biasing member biases the valve body in the first position. The fuel system includes a valve housing, the valve sleeve and the cover received within the valve housing, the valve housing defining a housing inlet configured to receive the fluid and in fluid communication with the inlet of the valve body, a housing primary outlet in fluid communication with the at least one primary sleeve outlet bore and a housing secondary outlet in fluid communication with the secondary sleeve outlet bore based on the position of the valve body. The valve sleeve defines at least one pressure bore, the at least one pressure bore is in fluid communication with the housing primary outlet based on the position of the valve body and the at least one pressure bore is in fluid communication with the housing primary outlet in the second position. The valve body includes a fluid chamber in fluid communication with the inlet and an internal wall, the fluid chamber including a first portion and a second portion, the at least one primary outlet bore defined in the first portion, the at least one secondary outlet bore defined in the second portion, the internal wall extends radially into the second portion such that the second portion has a second diameter that is different than a first diameter of the first portion and the channel is defined in the internal wall.

Also provided is a fuel system for a gas turbine engine. The fuel system includes a fuel pump configured to provide a fuel and a secondary flow lockout valve downstream from the fuel pump. The secondary flow lockout valve includes a valve sleeve that defines at least one primary sleeve outlet bore and at least one secondary sleeve outlet bore downstream from the at least one primary sleeve outlet bore. The secondary flow lockout valve includes a valve body movable within the valve sleeve. The valve body has a first end that defines an inlet configured to receive the fuel and a second end. The valve body includes at least one primary outlet bore downstream from at least one secondary outlet bore, and the valve body defines a channel in fluid communication with the at least one primary outlet bore. The secondary flow lockout valve includes a cover coupled to the valve sleeve that cooperates with the second end of the valve body to define a chamber. The valve body is movable relative to the cover. The chamber is in fluid communication with the channel such that the valve body is movable relative to the valve sleeve and the cover between at least a first position in which the at least one primary outlet bore is open and a second position in which both the at least one primary outlet bore and the at least one secondary outlet bore are open based on a pressure in the chamber. The secondary flow lockout valve includes a valve housing that defines a housing inlet configured to be in fluid communication with the fuel pump, a housing primary outlet in fluid communication with the at least one primary sleeve outlet bore and a housing secondary outlet in fluid communication with the at least one secondary sleeve outlet bore. The valve sleeve and the cover are received within the valve housing.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
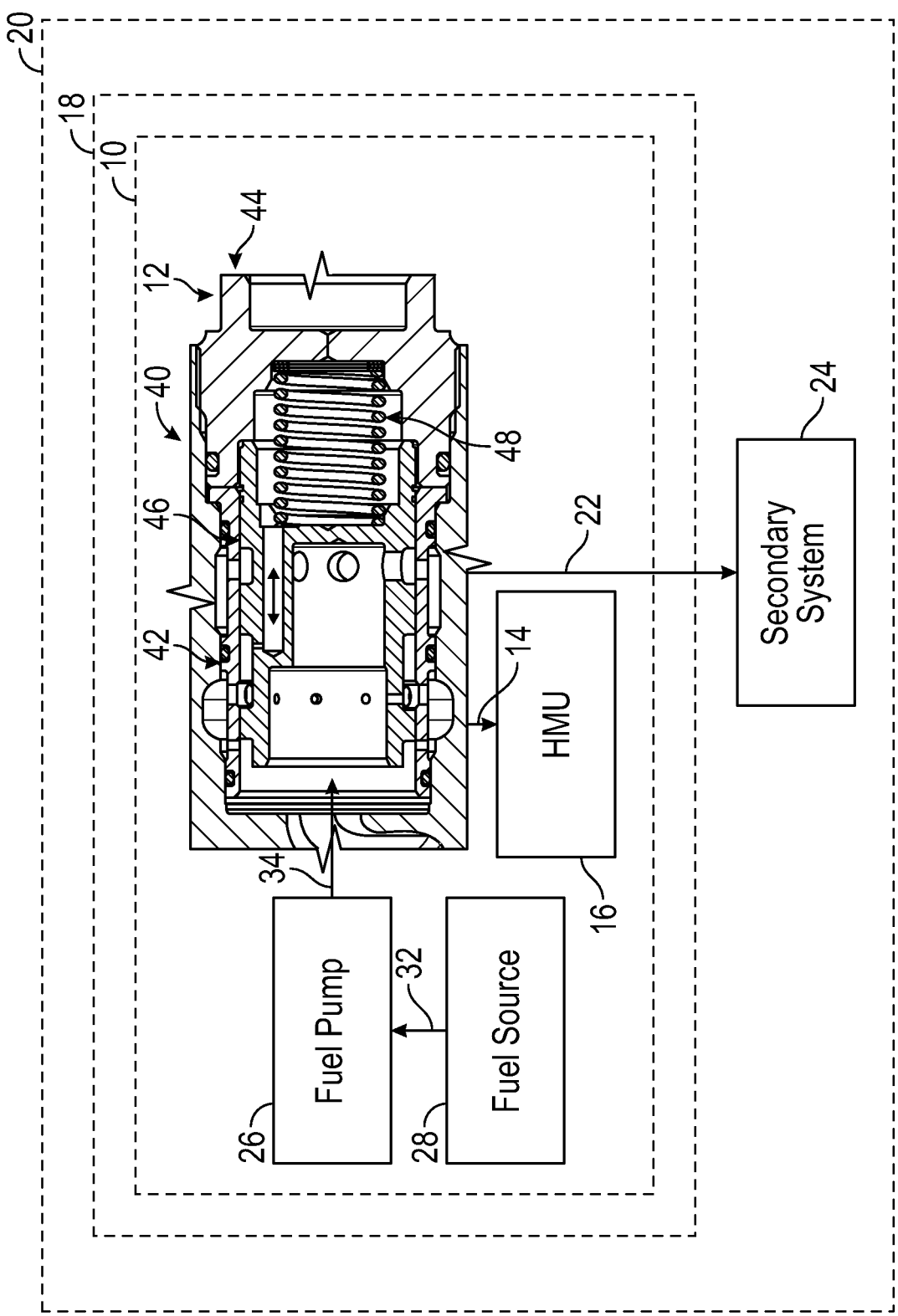
FIG. 1 is a functional block diagram of a fuel system that includes a secondary flow lockout valve for use with a gas turbine engine, which in one example, is onboard a vehicle, such as an aircraft and the secondary flow lockout valve is in a second, parked position.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of engine that would benefit from having a secondary flow lockout valve, and the gas turbine engine described herein for use onboard a vehicle is merely one exemplary embodiment according to the present disclosure. In addition, while the secondary flow lockout valve is described herein as being used with a gas turbine engine onboard a vehicle, such as a bus, motorcycle, train, motor vehicle, marine vessel, aircraft, rotorcraft and the like, the various teachings of the present disclosure can be used with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

With reference to FIG. 1, FIG. 1 is a functional block diagram of a fuel system 10, which includes a secondary flow lockout valve 12. As will be discussed, the secondary flow lockout valve 12 mechanically prioritizes a primary flow 14 to a hydromechanical unit (HMU) 16 associated with an engine, such as a gas turbine engine 18 onboard a vehicle, such as an aircraft 20. Based on a pressure of the primary flow 14, the secondary flow lockout valve 12 supplies a secondary flow 22 to a secondary system 24 associated with the aircraft 20. In this example, the primary flow 14 and the secondary flow 22 comprise a flow of fuel received from a fuel pump 26 associated with the fuel system 10. The fuel pump 26 is any suitable fuel pump that is generally known and is capable of supplying the gas turbine engine 18 with fuel. In one example, the fuel pump 26 is capable of providing about 4500 pounds per hour (pph) of fuel flow to the gas turbine engine 18, however, the fuel pump 26 may provide a greater or lesser flow rate based on the operating requirements of the gas turbine engine 18. For example, the fuel pump 26 may provide about 3000 pounds per hour (pph) of fuel flow or about 6000 pounds per hour (pph) of fuel flow based on the operating requirements of the associated gas turbine engine 18.

In one example, the gas turbine engine 18 is a turboprop gas turbine engine within the aircraft 20, although other arrangements and uses may be provided. For example, the gas turbine engine 18 may be a non-propulsive engine, such as an Auxiliary Power Unit (APU) deployed onboard the aircraft 20. In other embodiments, the gas turbine engine 18 may assume the form of an industrial power generator. As the gas turbine engine 18 may be any suitable gas turbine engine for use with the fuel system 10, the gas turbine engine 18 will not be discussed in great detail herein.

Briefly, the gas turbine engine 18 includes an intake section, a compressor section, a combustor section, a turbine section, and an exhaust section. The intake section includes an inlet duct for receiving air from a source, such as a source external to the aircraft 20. The compressor section includes at least one compressor, which is coupled to a shaft. The rotation of the shaft drives the compressor, which draws in air from the inlet duct of the intake section. The compressor raises the pressure of the air and directs majority of the high pressure air into the combustor section. In one example, the combustor section includes a combustor, which receives the compressed air from the compressor, and also receives a flow of fuel from the HMU 16. The fuel and compressed air are mixed within the combustor, and are combusted to produce relatively high-energy combustion gas. The relatively high-energy combustion gas that is generated in the combustor is supplied to the turbine section. The turbine section includes a turbine. However, it will be appreciated that the number of turbines, and/or the configurations thereof, may vary. In this example, the high-temperature combusted air from the combustor section expands through and rotates the turbine. The air is then exhausted through the exhaust section. As the turbine rotates, it drives equipment, such as a propeller associated with the aircraft 20 and systems in the gas turbine engine 18 via a shaft or spool, and optionally, one or more gear sets.

The fuel pump 26 is fluidly coupled to a fuel source 28. In one example, the fuel source 28 is one or more onboard fuel tanks associated with the aircraft 20. The fuel pump 26 draws fluid or fuel 32 from the fuel source 28 and pressurizes the fuel 32, which results in pressurized fuel 34. The fuel pump 26 is fluidly coupled to the secondary flow lockout valve 12, and provides the pressurized fuel 34 to the secondary flow lockout valve 12. The HMU 16 receives the primary flow 14 of fuel from the secondary flow lockout valve 12, and provides the fuel to the combustor associated with the gas turbine engine 18. The HMU 16 may comprise any suitable hydromechanical unit known in the art, which is capable of delivering the fuel to the associated gas turbine engine 18. The secondary flow lockout valve 12 also provides the secondary flow 22, based on the pressure of the primary flow 14, to the secondary system 24. The secondary system 24 may comprise any system associated with the aircraft 20, including, but not limited to, motive flow systems, anti-icing systems, etc.

Figure 1A:
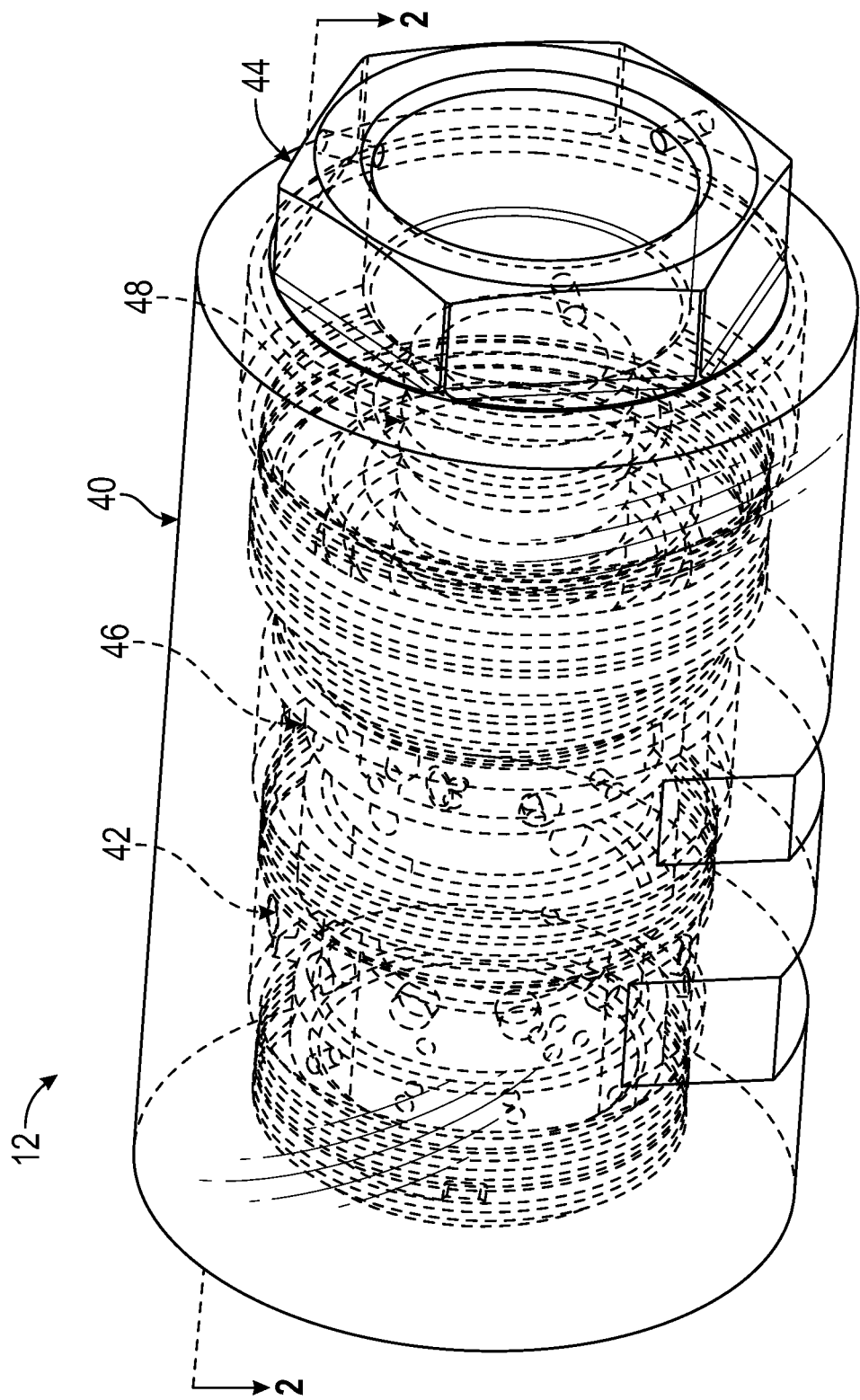
FIG. 1A is a perspective view of the secondary flow lockout valve in the first, start position.

The secondary flow lockout valve 12 is downstream of the fuel pump 26, and upstream from the HMU 16 and the secondary system 24. With reference to FIG. 1A, a perspective view of the secondary flow lockout valve 12 is shown. The secondary flow lockout valve 12 includes a valve housing 40, a valve sleeve 42, a cover 44, a valve body 46 and a biasing member 48. The valve housing 40, the valve sleeve 42, the cover 44 and the valve body 46 are composed of a metal or metal alloy, including, but not limited to aluminum alloy. The valve housing 40, the valve sleeve 42, the cover 44 and the valve body 46 may be cast, forged, machined, additively manufactured, etc. The biasing member 48 is composed of a metal or metal alloy, including, but not limited to stainless steel and may be extruded.

Figure 2:
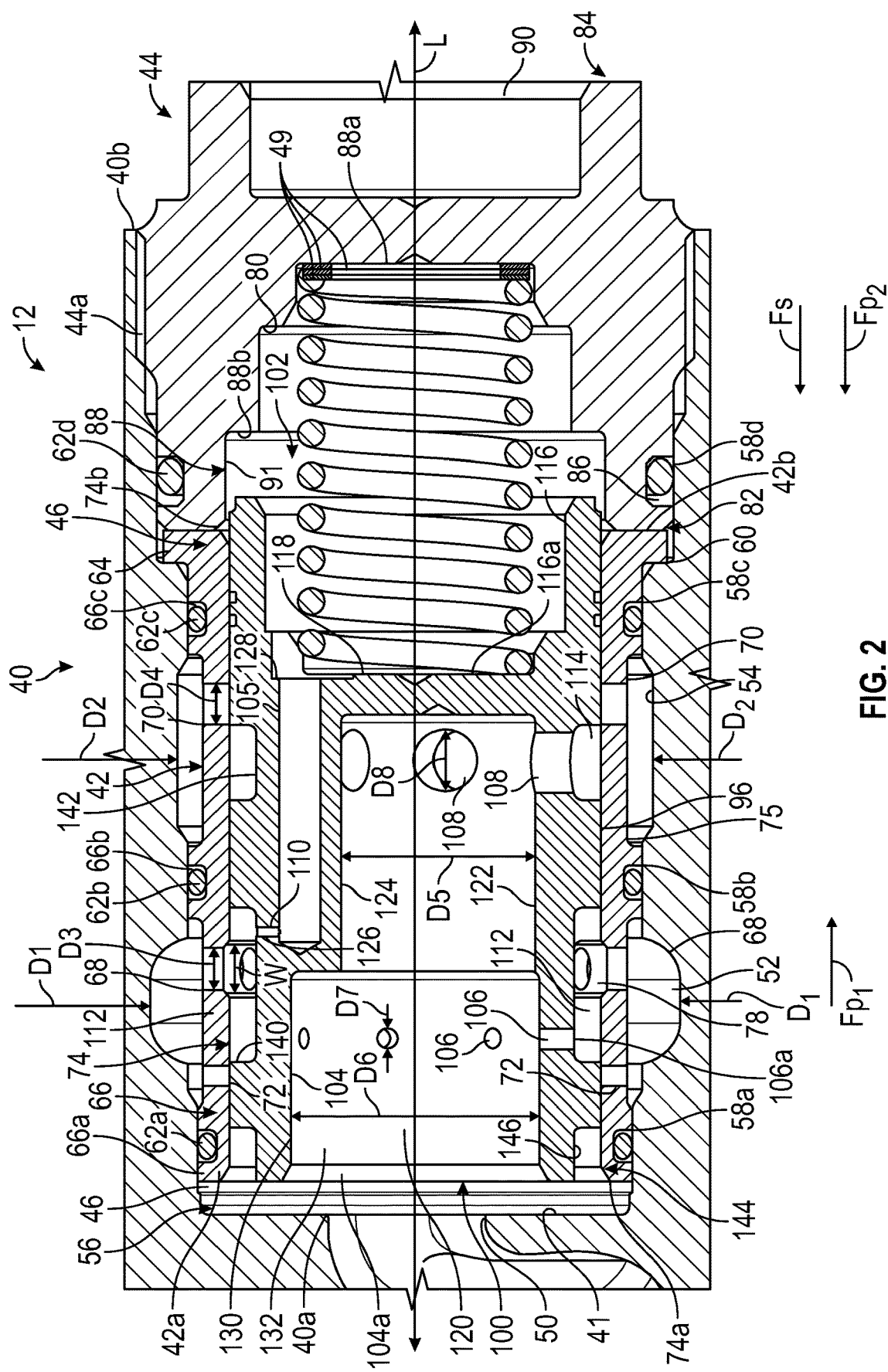
FIG. 2 is a cross-sectional view of the secondary flow lockout valve of FIG. 1, taken from the perspective of line 2-2 of FIG. 1A, in which the secondary flow lockout valve is in a third, intermediate position.
Figure 3:
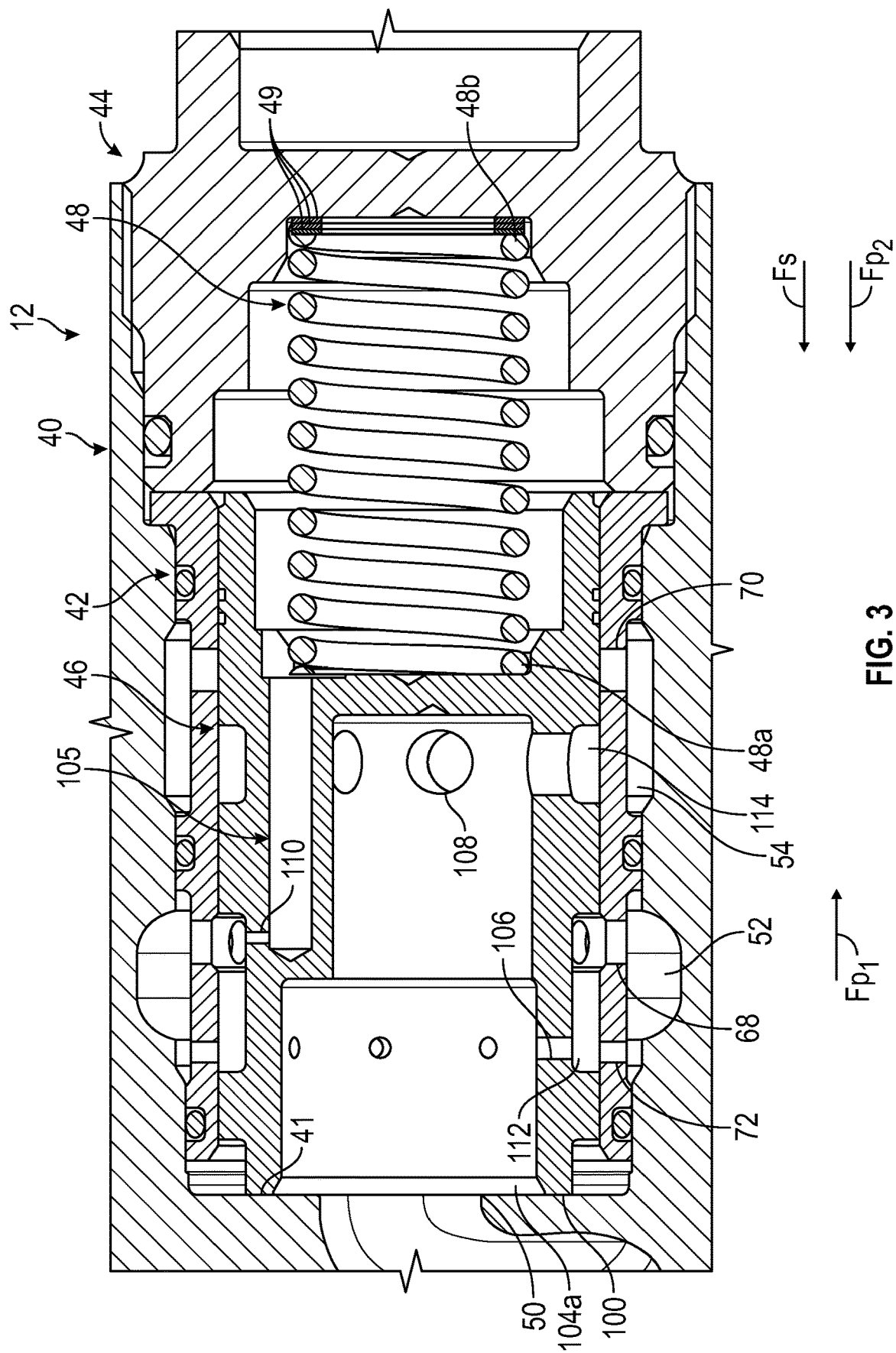
FIG. 3 is a cross-sectional view of the secondary flow lockout valve of FIG. 1, taken from line 2-2 of FIG. 1A, in which the secondary flow lockout valve is in a first, start position.

With reference to FIG. 2, a detail cross-sectional view of the secondary flow lockout valve 12 is shown. The valve housing 40 defines a housing inlet 50, a housing primary outlet 52 and a housing secondary outlet 54. The valve housing 40 also defines a central bore 56, which receives the valve sleeve 42 and the cover 44. In this example, the housing inlet 50 is defined at a first end 40a of the valve housing 40, which is opposite a second end 40b of the valve housing 40 that receives the cover 44. The first end 40a of the valve housing 40 also defines a stop 41 for the valve body 46 when the secondary flow lockout valve 12 is in the first, start position (FIG. 3). The housing inlet 50 is circular, however, the housing inlet 50 may have any desired shape. The housing primary outlet 52 is downstream of the housing inlet 50. The housing primary outlet 52 is annular, and is defined about a circumference of the valve sleeve 42. The housing primary outlet 52 is fluidly coupled to the HMU 16 (FIG. 1). The housing secondary outlet 54 is downstream of the housing inlet 50 and the housing primary outlet 52. The housing secondary outlet 54 is annular, and is defined about the circumference of the valve sleeve 42. The housing secondary outlet 54 is fluidly coupled to the secondary system 24 (FIG. 1). In one example, the housing primary outlet 52 has a diameter D1, which is different and greater than a diameter D2 of the housing secondary outlet 54. The housing primary outlet 52 has a greater area than the housing secondary outlet 54. The larger diameter D1 of the housing primary outlet 52 assists in minimizing a pressure drop of the fuel provided to the HMU 16.

The central bore 56 is sized and dimensioned to cooperate with the valve sleeve 42 and the cover 44 to fluidly isolate the housing inlet 50, the housing primary outlet 52 and the housing secondary outlet 54. A plurality of sealing interfaces 58 and a retaining ledge 60 are defined in the valve housing 40 about the central bore 56. In one example, the central bore 56 includes four sealing interfaces 58a-58d. Generally, the sealing interfaces 58a-58d are defined to cooperate with the valve sleeve 42 or the cover 44 to inhibit fuel flow. In this example, the sealing interfaces 58a-58c cooperate with the valve sleeve 42, while the sealing interface 58d cooperates with the cover 44. The sealing interfaces 58a-58d are smooth and are defined about a circumference of the central bore 56. In one example, a respective one of a plurality of sealing members 62 are received between the sealing interfaces 58a-58d and the respective one of the valve sleeve 42 and cover 44. In this example, the secondary flow lockout valve 12 includes four sealing members 62a-62d, which comprise O-rings, for example, that are formed of an elastomeric material.

The retaining ledge 60 is defined within the central bore 56. The retaining ledge 60 provides a stop for the further advancement of the valve sleeve 42 within the central bore 56. Generally, the retaining ledge 60 extends inwardly from the central bore 56 to reduce a diameter of the central bore 56, which contacts a retaining flange 64 of the valve sleeve 42 to stop the advancement of the valve sleeve 42. In one example, the valve sleeve 42 and the cover 44 are received within the central bore 56 such that the valve sleeve 42 is spaced a distance apart from the housing inlet 50, which enables the fuel received from the housing inlet 50 to apply a pressure evenly about a circumference of the valve body 46, as will be discussed.

Figure 2A:
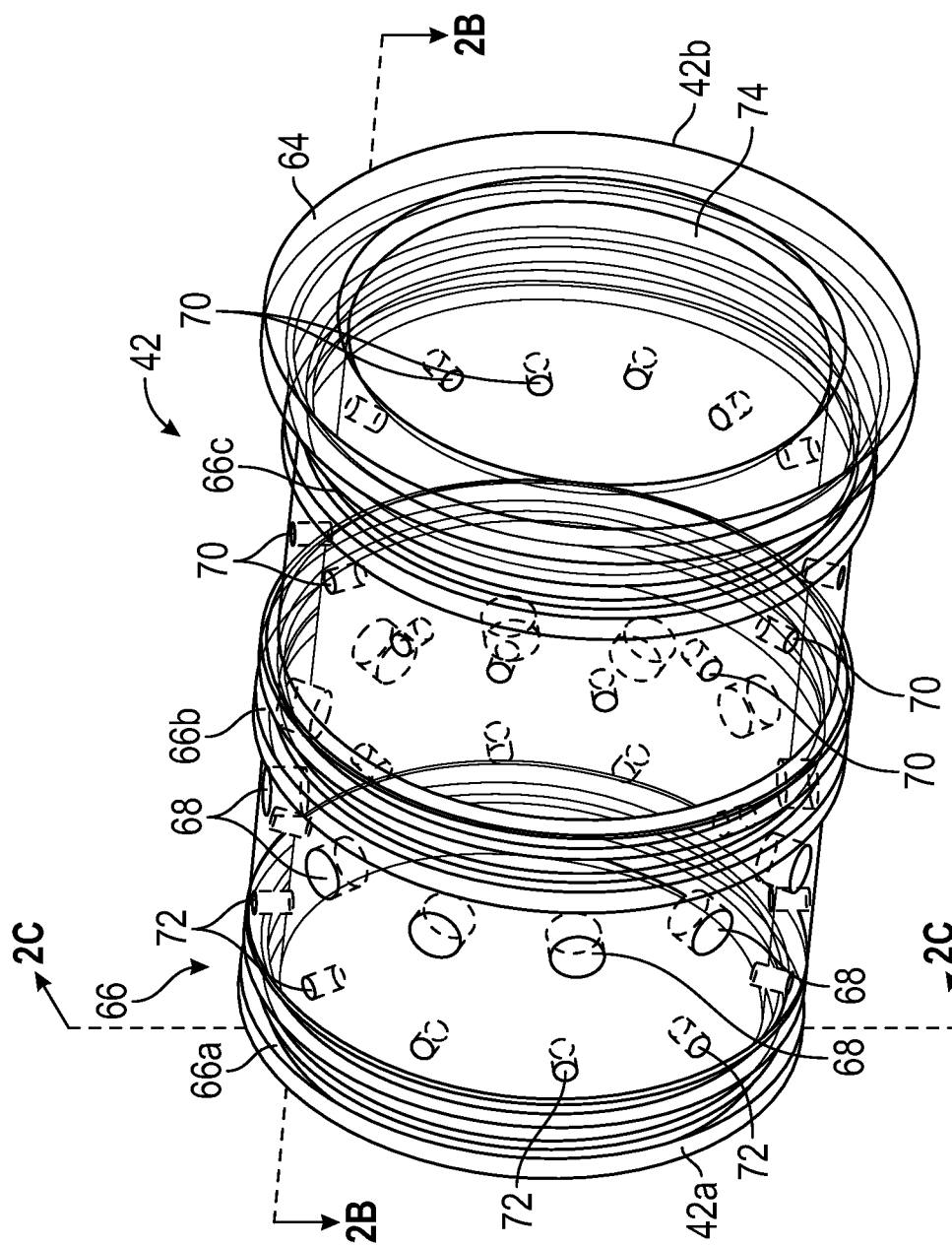
FIG. 2A is a perspective view of a valve sleeve associated with the secondary flow lockout valve of FIG. 1.

With reference to FIG. 2A, the valve sleeve 42 is cylindrical. The valve sleeve 42 includes the retaining flange 64 and defines a plurality of sealing channels 66, a plurality of primary sleeve outlet bores or primary outlet bores 68, a plurality of secondary sleeve outlet bores or secondary outlet bores 70, a plurality of pressure bores 72 and defines a central sleeve bore 74. With reference back to FIG. 2, the valve body 46 is received within the central sleeve bore 74, and each of the primary outlet bores 68, the secondary outlet bores 70, the pressure bores 72 and the housing inlet 50 are in fluid communication with the central sleeve bore 74. The central sleeve bore 74 is defined from a first sleeve end 42a to an opposite second sleeve end 42b, and generally extends along a longitudinal axis L of the secondary flow lockout valve 12. The first sleeve end 42a is proximate the housing inlet 50, and the second sleeve end 42b is coupled to the cover 44. The retaining flange 64 extends outwardly from the second sleeve end 42b and is coupled to the cover 44. The retaining flange 64 contacts the retaining ledge 60 when the valve sleeve 42 is received within the valve housing 40.

The central sleeve bore 74 has a first end 74a in fluid communication with or fluidly coupled to the housing inlet 50, and a second end 74b opposite the first end 74a. The first end 74a of the central sleeve bore 74 is at the first sleeve end 42a, and the second end 74b is at the second sleeve end 42b. The second end 74b is in communication with the cover 44. The first end 74a may include a slight countersink to aid in directing the flow of the fuel into the valve body 46, and to aid in the manufacturing of the valve sleeve 42. The second end 74b may also include a slight countersink to aid in the manufacturing of the valve sleeve 42.

The plurality of sealing channels 66 are defined about an outer perimeter or circumference 75 of the valve sleeve 42. In one example, the valve sleeve 42 includes three sealing channels 66a-66c, one for a respective one of the sealing members 62a-62c. The sealing channels 66a-66c are spaced apart along the longitudinal axis L between the first sleeve end 42a and the second sleeve end 42b. Each sealing channel 66a-66c is substantially U-shaped, and receives a respective one of the sealing members 62a-62c. The sealing members 62a-62c may be press-fit into the respective one of the sealing channels 66a-66c or may be retained via mechanical fasteners, etc. The sealing members 62a-62c also fluidly isolate the housing primary outlet 52 from the housing secondary outlet 54.

The primary outlet bores 68 are defined through the valve sleeve 42 from the outer circumference 75 to an inner perimeter or circumference 76 so as to be in communication with the central sleeve bore 74. The primary outlet bores 68 are downstream from the housing inlet 50 and the pressure bores 72. The primary outlet bores 68 are defined through the valve sleeve 42 between the second sleeve end 42b and the pressure bores 72. The primary outlet bores 68 fluidly couple the housing inlet 50 to the housing primary outlet 52 based on a position of the valve body 46. In one example, the valve sleeve 42 includes about 12 primary outlet bores 68, which are evenly spaced about the outer circumference 75 of the valve sleeve 42. The primary outlet bores 68 have a diameter D3, which is in this example, is the same as a diameter D4 of the secondary outlet bores 70. In one example, a recessed groove 78 may be defined about the inner circumference 76 of the valve sleeve 42. The recessed groove 78 may be defined into the inner circumference 76 to assist in guiding the fuel into the primary outlet bores 68. The recessed groove 78 may have a width W that is greater than the diameter D3, and may have a substantially U-shaped cross-section.

Figure 2B:
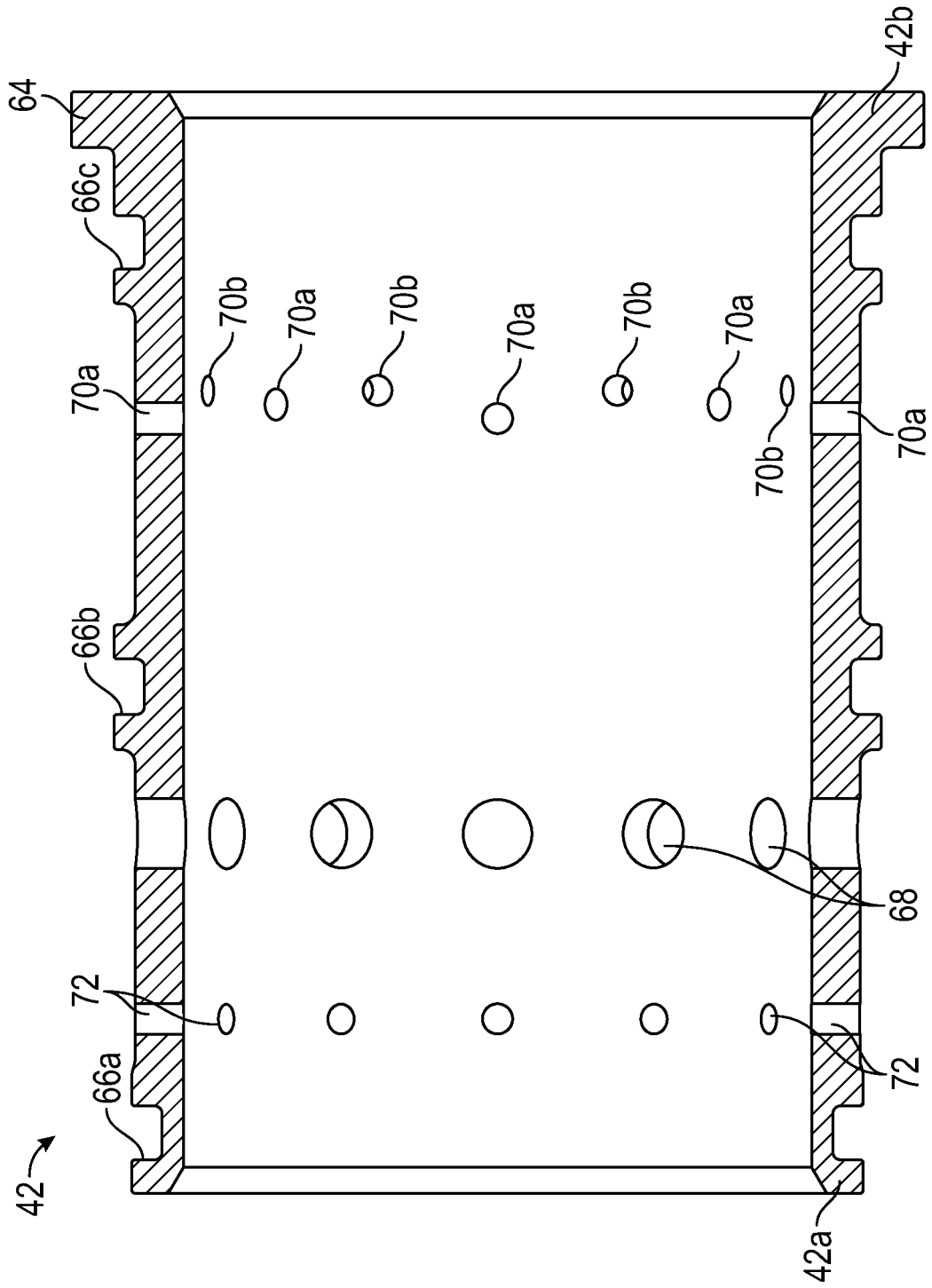
FIG. 2B is a cross-sectional view of the valve sleeve of FIG. 2A, taken along line 2B-2B of FIG. 2A.

The secondary outlet bores 70 are downstream from the primary outlet bores 68, the pressure bores 72 and the housing inlet 50. The secondary outlet bores 70 are defined through the valve sleeve 42 from the outer circumference 75 to the inner circumference 76 so as to be in communication with the central sleeve bore 74. The secondary outlet bores 70 fluidly couple the housing inlet 50 to the housing secondary outlet 54 based on a position of the valve body 46. The secondary outlet bores 70 are defined through the valve sleeve 42 between the primary outlet bores 68 and the second sleeve end 42b. In one example, the valve sleeve 42 includes about 16 secondary outlet bores 70, eight of which are evenly spaced about the outer circumference 75 of the valve sleeve 42. The other eight secondary outlet bores 70 may be offset from the remainder of the secondary outlet bores 70. For example, with reference to FIG. 2B, a cross-sectional view of the valve sleeve 42 is shown. As shown, eight bores 70a of the secondary outlet bores 70 are spaced evenly about the circumference of the valve sleeve 42, and eight bores 70b are spaced evenly about the circumference of the valve sleeve 42. The eight bores 70b are each offset from and alternate with respective ones of the eight bores 70a. The offset between the eight bores 70a from the eight bores 70b controls the gain of the secondary flow lockout valve 12 as the valve body 46 strokes, thereby increasing the stability of the secondary flow lockout valve 12 as the fluid pressure transitions the secondary flow lockout valve 12 from the first, parked position to the second, parked position.

Figure 2C:
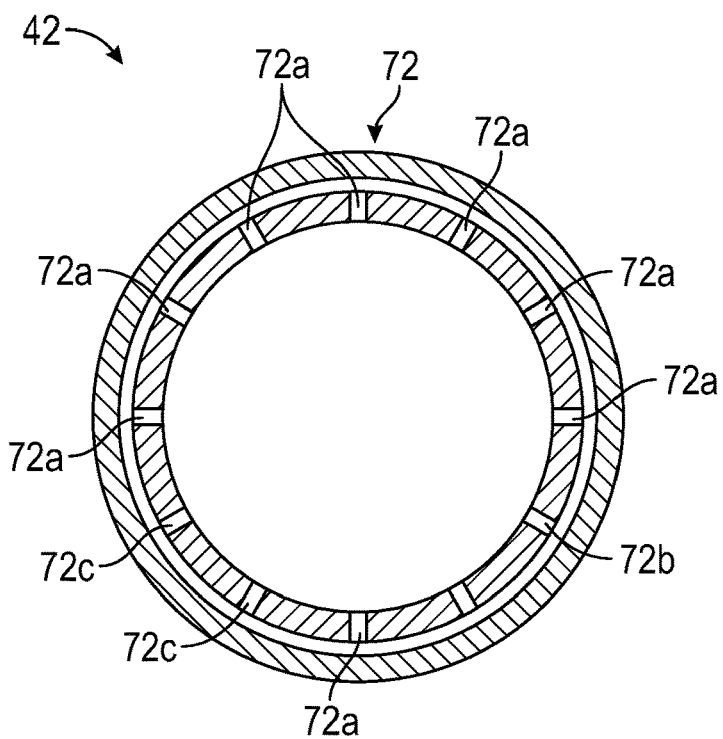
FIG. 2C is a cross-sectional view of the valve sleeve of FIG. 2A, taken along line 2C-2C of FIG. 2A, which illustrates an arrangement of pressure bores defined through the valve sleeve.

With reference back to FIG. 2, the pressure bores 72 are downstream from the housing inlet 50. The pressure bores 72 are defined through the valve sleeve 42 from the outer circumference 75 to the inner circumference 76 so as to be in communication with the central sleeve bore 74. The pressure bores 72 fluidly couple the housing inlet 50 to the housing primary outlet 52 based on a position of the valve body 46. Generally, the pressure bores 72 reduce a pressure drop in the housing primary outlet 52 when the secondary flow lockout valve 12 is in a second, parked position. The pressure bores 72 are defined through the valve sleeve 42 between the first sleeve end 42a and the primary outlet bores 68. In one example, with reference to FIG. 2C, the valve sleeve 42 includes about 11 pressure bores 72, a first group of 10 pressure bores 72a are defined adjacent to each other and are spaced evenly apart about 75% of the outer circumference 75, and the remaining single pressure bore 72b is spaced about 30% apart from one pressure bore 72a of the first group about the outer circumference 75. This arrangement of the pressure bores 72 improves the stability of the secondary flow lockout valve 12 by controlling the gain of pressure bores 72 as the valve body 46 translates from the first, start position to the second, parked position. The pressure bores 72 are defined through the valve sleeve 42 so as to be asymmetric with respect to the longitudinal axis L. While the primary function of the pressure bores 72 is to minimize pressure drop when the secondary flow lockout valve 12 is in the second, parked position, the pattern and size of the pressure bores 72 also cooperates with the array of the secondary outlet bores 70 to provide stability during the transition of the secondary flow lockout valve 12 from the first, start position to the second, parked position.

Figure 4:
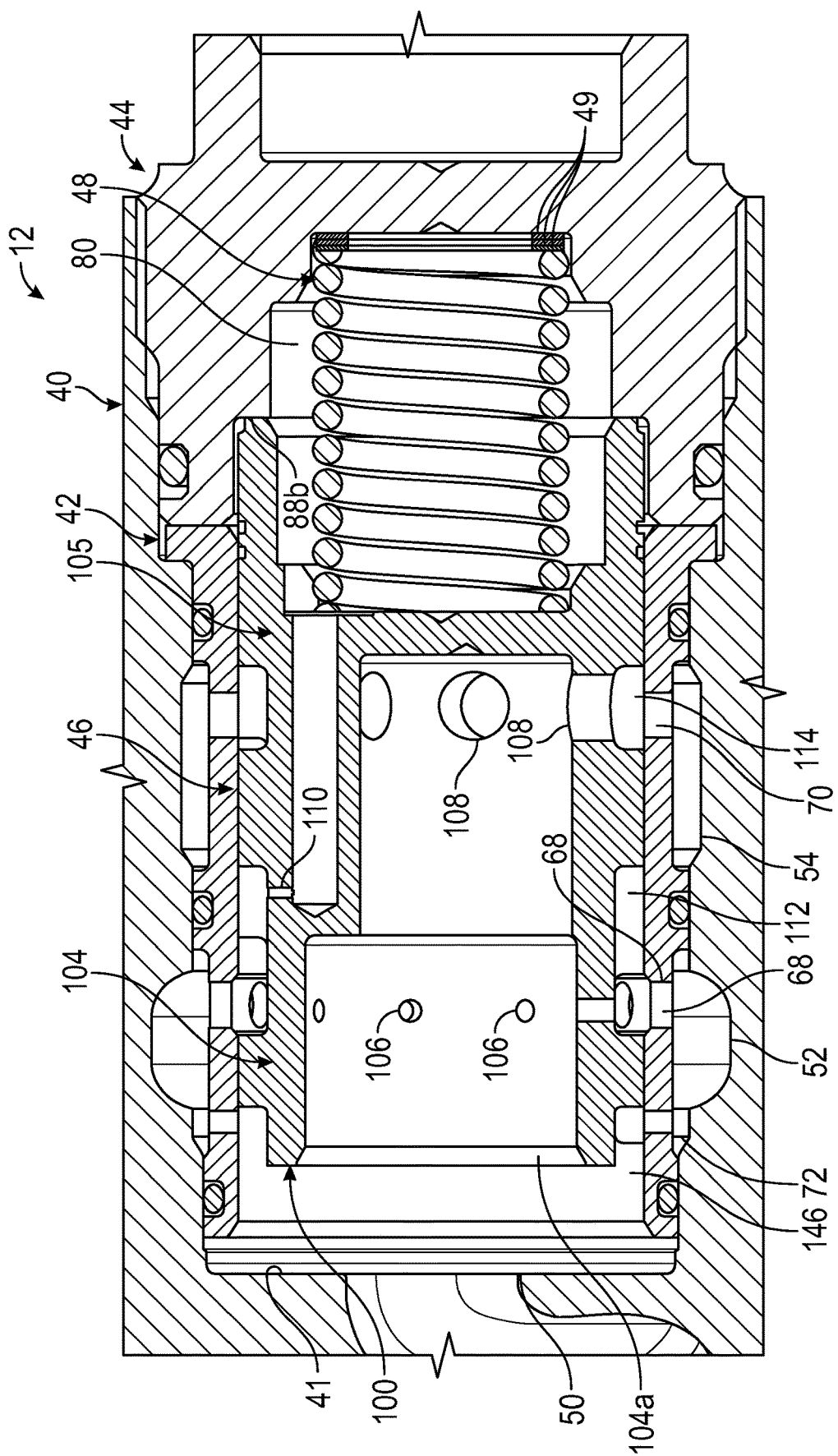
FIG. 4 is a cross-sectional view of the secondary flow lockout valve of FIG. 1, taken from the perspective of line 2-2 of FIG. 1A, in which the secondary flow lockout valve is in the second, parked position.

With reference back to FIG. 2, the cover 44 encloses the second sleeve end 42b and cooperates with the valve body 46 to define a chamber 80. The chamber 80 receives the biasing member 48, and a portion of the fuel from the housing inlet 50, as will be discussed. The cover 44 is substantially cylindrical, and includes a first cover end 82, a second cover end 84 opposite the first cover end 82 and a sealing channel 86. The cover 44 is symmetric about the longitudinal axis L. The first cover end 82 is coupled to the second sleeve end 42b, and is generally sized to contact the second sleeve end 42b along the retaining flange 64. The first cover end 82 includes a counterbore 88 such that the first cover end 82 is circumferentially open. The counterbore 88 cooperates with the valve body 46 to define the chamber 80. A terminal end of the counterbore 88 defines a seat 88a for the biasing member 48. The counterbore 88 also defines a stop surface 88b between the first cover end 82 and the terminal end that defines the seat 88a. The stop surface 88b reduces a diameter of the counterbore 88 such that the valve body 46 contacts the stop surface 88b in the second, parked position, which inhibits a further advancement of the valve body 46 within the cover 44. Generally, the counterbore 88 at the first cover end 82 includes a body receiving portion 91, which receives a portion of the valve body 46 as the valve body 46 moves between a first, start position (FIG. 3) and a second, parked position (FIG. 4).

The second cover end 84 defines a second counterbore 90. The second counterbore 90 reduces a weight associated with the cover 44. The sealing channel 86 receives the sealing member 62d. The sealing channel 86 is defined about an outer perimeter or circumference 44a of the cover 44, and is substantially U-shaped in cross-section. In this example, the sealing channel 86 is defined proximate the first cover end 82.

Figure 2D:
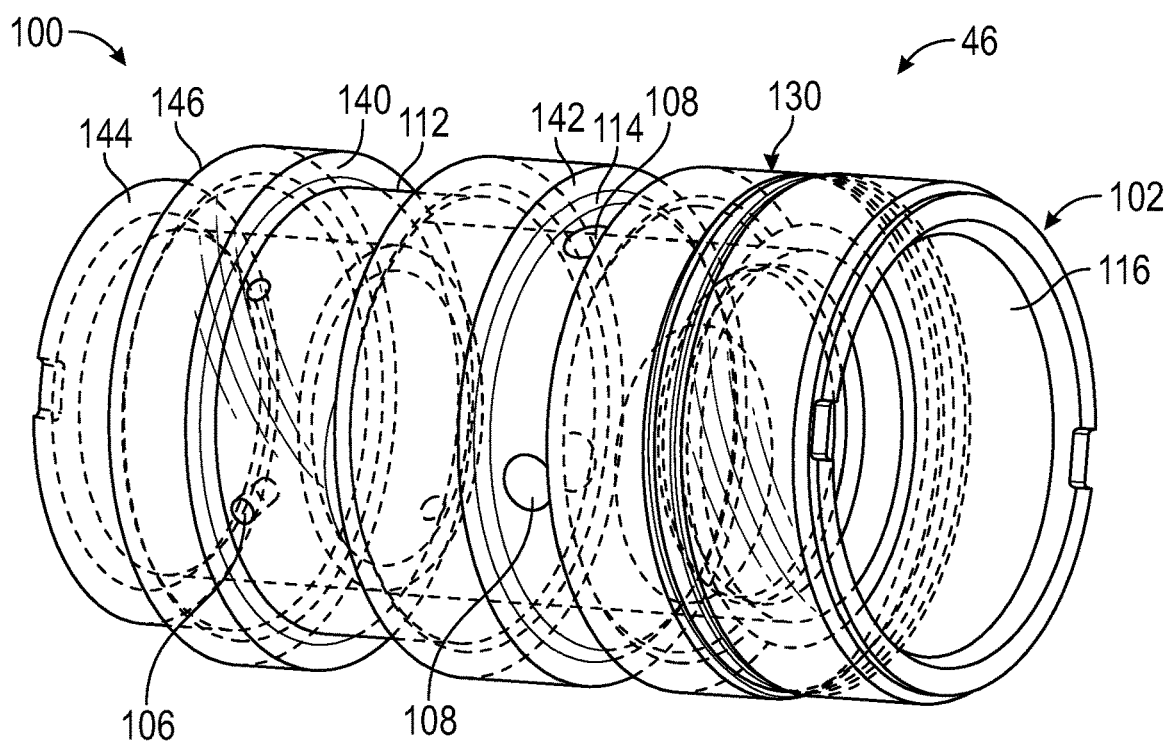
FIG. 2D is a perspective view of a valve body associated with the secondary flow lockout valve of FIG. 1.

The valve body 46 is received within the central sleeve bore 74 of the valve sleeve 42 and the counterbore 88 of the cover 44. The valve body 46 includes a first valve end 100, a second valve end 102 opposite the first valve end 100, a fluid chamber 104, a pressure channel 105, a plurality of primary body bores 106, a plurality of secondary body bores 108 and at least one pressure inlet bore 110. With reference to FIG. 2D, the valve body 46 also includes a primary body outlet manifold 112 and a secondary body outlet manifold 114. The first valve end 100 is circumferentially open, and receives the fuel from the housing inlet 50. With reference back to FIG. 2, the first valve end 100 contacts the stop 41 defined by the valve housing 40 when the secondary flow lockout valve 12 is in the first, start position (FIG. 3). The first valve end 100 is fluidly coupled or in fluid communication with the fluid chamber 104. The second valve end 102 includes a counterbore 116, which cooperates with the counterbore 88 of the cover 44 to define the chamber 80 that receives the biasing member 48. The counterbore 116 defines a seat 116a for the biasing member 48 along an internal wall 118. The internal wall 118 separates the fluid chamber 104 from the chamber 80. The internal wall 118 may include features that assist in forming the counterbore 116. The counterbore 116 is also fluidly coupled to or in fluid communication with the pressure channel 105.

The fluid chamber 104 extends from the first valve end 100 to proximate the second valve end 102. The fluid chamber 104 defines an inlet 104a for the valve body 46, and includes a primary portion 120 and a secondary portion 122. The primary portion 120 extends from the inlet 104a to the secondary portion 122. A second internal wall 124 is defined along the secondary portion 122 from the primary portion 120 to the internal wall 118. The second internal wall 124 reduces a diameter of the secondary portion 122. The secondary portion 122 has a secondary diameter D5, which is different, and in this example, less than a diameter D6 of the primary portion 120. The second internal wall 124 extends inward from a sidewall 46a of the valve body 46, and thus, the valve body 46 is asymmetric with respect to the longitudinal axis L.

The pressure channel 105 is defined within the second internal wall 124. The pressure channel 105 extends within the second internal wall 124 from the secondary portion 122 of the fluid chamber 104 through the internal wall 118 to the second valve end 102. The pressure channel 105 has a pressure channel inlet 126 and a pressure channel outlet 128. The pressure channel inlet 126 is fluidly coupled to or in fluid communication with the pressure inlet bore 110. The pressure channel outlet 128 is downstream from the pressure channel inlet 126, and is fluidly coupled to or in fluid communication with the chamber 80. As will be discussed, the fluid received through the pressure channel 105 applies a force to the biasing member 48, which results in corresponding movement of the valve body 46.

The primary body bores 106 are defined through the primary portion 120 of the fluid chamber 104 of the valve body 46. The primary body bores 106 are defined through the valve body 46 from an outer perimeter or circumference 130 of the valve body 46 to an inner perimeter or circumference 132 so as to be in communication with the primary portion 120 of the fluid chamber 104. The primary body bores 106 are downstream from the inlet 104a. The primary body bores 106 are defined through the primary portion 120 between the inlet 104a and the secondary portion 122. The primary body bores 106 fluidly couple the inlet 104a to the primary body outlet manifold 112. Thus, generally, regardless of the position of the valve body 46, the primary body bores 106 fluidly couple the fuel received through the inlet 104a to the primary body outlet manifold 112, which ensures that the gas turbine engine 18 receives sufficient fuel, such as during start-up or cold start conditions. In one example, the valve body 46 includes about five primary body bores 106, which are evenly spaced about the outer circumference 130 of the valve body 46. The primary body bores 106 have a diameter D7, which is in this example, is different and less than a diameter D8 of the secondary body bores 108.

The secondary body bores 108 are defined through the secondary portion 122 of the fluid chamber 104 of the valve body 46. The secondary body bores 108 are defined through the valve body 46 from the outer circumference 130 to the inner circumference 132 so as to be in communication with the secondary portion 122 of the fluid chamber 104. The secondary body bores 108 are downstream from the inlet 104a and the primary body bores 106. The secondary body bores 108 are defined through the secondary portion 122 so as to be proximate the internal wall 118. The secondary body bores 108 fluidly couple the inlet 104a to the secondary body outlet manifold 114. In one example, the valve body 46 includes about five secondary body bores 108, which are evenly spaced about the outer circumference 130 of the valve body 46 and are defined on opposite sides of the pressure channel 105. Stated another way, the secondary body bores 108 are defined through the valve body 46 so as to be fluidly isolated or discrete from the pressure channel 105, and thus, the secondary body bores 108 do not intersect and are not fluidly coupled to the pressure channel 105.

The pressure inlet bore 110 is defined through the outer circumference 130 of the valve body 46. The pressure inlet bore 110 is defined through the valve body 46 from the outer circumference 130 to the pressure channel 105 so as to be in communication with the pressure channel 105. The pressure inlet bore 110 is downstream from outlets 106a of the primary body bores 106 and is fluidly coupled to or is in fluid communication with the primary body outlet manifold 112. The pressure inlet bore 110 fluidly couples the primary body outlet manifold 112 to the pressure channel 105. By fluidly coupling the pressure channel 105 to the primary body outlet manifold 112, a force applied to the biasing member 48 is based on a fluid pressure flowing through the primary body outlet manifold 112. This ensures that a movement of the valve body 46 from the first, start position toward the second, parked position is based on a pressure of the fuel flowing to the HMU 16 (FIG. 1), which acts on the biasing member 48 in the chamber 80 via the pressure channel 105. Thus, the chamber 80 acts as a control chamber that controls a movement of the valve body 46 based on a pressure of fluid in the primary body outlet manifold 112. This prioritizes the flow of the fuel to the HMU 16, ensuring that the HMU 16 has a sufficient flow of the fuel to start the gas turbine engine 18 before fuel is provided to the secondary system 24. In one example, the valve body 46 includes just one pressure inlet bore 110, which is also sized and configured to provide restrictive fluid flow damping to the chamber 80 to improve stability of the valve body 46 as it transitions from the first, start position to the second, parked position. However, the valve body 46 may include a smaller or larger pressure inlet bore 110 based on the amount of restrictive fluid flow damping required for transitional stability of valve body 46.

The primary body outlet manifold 112 is defined between the outer circumference 130 of the valve body 46 and the inner circumference 76 of the valve sleeve 42. The primary body outlet manifold 112 is fluidly coupled to and in fluid communication with the primary body bores 106 and the primary outlet bores 68 to enable the fuel to enter the housing primary outlet 52. In one example, the primary body outlet manifold 112 is defined as a channel 140 formed in the outer circumference 130 (FIG. 2D). The channel 140 is defined radially and axially inward from the outer circumference 130 of the valve body 46. The channel 140 has a diameter that is different, and in this example, less than a diameter of the central sleeve bore 74 such that the fluid is directed into the channel 140, but is inhibited from leaking between the valve body 46 and the valve sleeve 42 by the remainder or surrounding portion of the outer circumference 130. The primary body outlet manifold 112 is defined for a width that is different and greater than a distance of travel of the valve body 46 such that the primary body bores 106 remain in fluid communication with the primary body outlet manifold 112.

The secondary body outlet manifold 114 is defined between the outer circumference 130 of the valve body 46 and the inner circumference 76 of the valve sleeve 42 (FIG. 2D). The secondary body outlet manifold 114 is fluidly coupled to and in fluid communication with the secondary body bores 108 and the secondary outlet bores 70 to enable the fuel to enter the housing secondary outlet 54 based on a position of the valve body 46. In one example, the secondary body outlet manifold 114 is defined as a second channel 142 formed in the outer circumference 130 (FIG. 2D). The second channel 142 is defined radially and axially inward from the outer circumference 130 of the valve body 46. The second channel 142 has a diameter that is different, and in this example, less than a diameter of the central sleeve bore 74 such that the fuel is directed into the second channel 142, but is inhibited from leaking between the valve body 46 and the valve sleeve 42 by the remainder or surrounding portion of the outer circumference 130. The primary body outlet manifold 112 is defined for a second width that is different and less than a distance of travel of the valve body 46 such that the secondary body bores 108 are in selective fluid communication with the secondary body outlet manifold 114 based on the position of the valve body 46.

In this example, a third body manifold 144 is defined between the outer circumference 130 of the valve body 46 at the first valve end 100 and the inner circumference 76 of the valve sleeve 42. The third body manifold 144 is fluidly coupled to and in fluid communication with the pressure bores 72 of the valve sleeve 42 to enable the fuel to enter the pressure bores 72 based on a position of the valve body 46. In one example, the third body manifold 144 is defined as a third channel 146 formed in the outer circumference 130 (FIG. 2D). The third channel 146 is defined radially and axially inward from the outer circumference 130 of the valve body 46. The third channel 146 has a diameter that is different, and in this example, less than a diameter of the central sleeve bore 74 such that the fuel is directed into the third channel 146, but is inhibited from leaking between the valve body 46 and the valve sleeve 42 by the remainder or surrounding portion of the outer circumference 130. The third channel 146 is defined for a third width that is different and less than a distance of travel of the valve body 46 (and different and less than the second width) such that the pressure bores 72 of the valve sleeve 42 are in selective fluid communication with the third channel 146 based on the position of the valve body 46.

The biasing member 48 is coupled in the chamber 80. The biasing member 48, in one example, is a helical compression spring. The biasing member 48 has a first end 48a that contacts the seat 116a of the valve body 46, and an opposite second end 48b that contacts force adjusting shims 49. The force adjusting shims 49 contact the seat 88a of the cover 44. The biasing member 48 biases or applies a spring force Fs to the valve body 46 to maintain the valve body 46 in the first, start position (FIG. 3). Upon receipt of fluid force Fp1 from the fluid pressure received by the pressure channel 105, the biasing member 48 compresses such that the valve body 46 moves toward the second, parked position (FIG. 4), as will be discussed. In one example, the force adjusting shims 49 are coupled to the seat 88a of the cover 44 to tune a predetermined amount of force applied by the biasing member 48 in the first, start position. The force adjusting shims 49 are generally circular to correspond with the second end 48b of the biasing member 48, however, the force adjusting shims 49 may have any desired shape. The force adjusting shims 49 may composed of a metal or metal alloy, and may be coupled to the seat 88a of the cover 44 via welding, for example. By including the force adjusting shims 49 within the cover 44, the secondary flow lockout valve 12 is capable of accommodating manufacturing tolerances associated with the valve housing 40, the valve sleeve 42, the valve body 46, the cover 44 and the biasing member 48, thereby precisely meeting the functional requirements of the secondary flow lockout valve 12

In order to assemble the secondary flow lockout valve 12, in one example, with the valve housing 40, the valve sleeve 42, the valve body 46, the cover 44 and the biasing member 48 formed, the sealing members 62a-62c are coupled to the sealing channels 66a-66c. The valve body 46 is coupled to the valve sleeve 42, and the valve sleeve 42 is coupled to the valve housing 40 such that the retaining flange 64 contacts the retaining ledge 60. The sealing member 62d is coupled to the sealing channel 86 of the cover 44. The first end 48a of the biasing member 48 is coupled to the seat 116a, and cover 44 is coupled to the valve housing 40 to couple the second end 48b of the biasing member 48 to the seat 88a.

With the secondary flow lockout valve 12 assembled, with reference to FIG. 1, the secondary flow lockout valve 12 is coupled to the fuel system 10 such that the housing inlet 50 is fluidly coupled to or in fluid communication with the fuel pump 26, the housing primary outlet 52 is fluidly coupled to or in fluid communication with the HMU 16 and the housing secondary outlet 54 is fluidly coupled to or in fluid communication with the secondary system 24. As shown in FIG. 3, the secondary flow lockout valve 12 is in the first, start position. The first, start position is the position of the secondary flow lockout valve 12 during a start-up condition of the gas turbine engine 18.

Once the fuel pump 26 is initiated, with reference to FIG. 3, fuel is received from the fuel pump 26 at the housing inlet 50. In the first, start position, the first valve end 100 of the valve body 46 contacts the stop 41 defined by the valve housing 40. The fuel flows through the housing inlet 50, through the primary body bores 106 and into the primary body outlet manifold 112. The pressurized fuel 32 flowing through the housing inlet 50 and pressurizing the third channel 146 creates the fluid force Fp1 against the first valve end 100 of valve body 46. Thus, in the first, start position, the primary body bores 106 are open, but are sized to only allow the fuel flow necessary to meet the start-up flow requirements of gas turbine engine 18. Thereby, the restrictive size of primary body bores 106 creates a lower pressure in the primary body outlet manifold 112 than the pressure in third channel 146, as a function of the amount of fuel passing through primary body bores 106. As the fuel enters the primary body outlet manifold 112, a portion of the fuel flows into the pressure inlet bore 110. From the pressure inlet bore 110, the fuel flows through the pressure channel 105 into the chamber 80 until the pressure in the primary body outlet manifold 112 and the chamber 80 become equal, and creates the fluid force Fp2 against the second valve end 102 of the valve body 46. The remainder of the fuel flows from the primary body outlet manifold 112 through the primary outlet bores 68 and into the housing primary outlet 52. From the housing primary outlet 52, the fuel flows to the HMU 16 (FIG. 1). As shown, in the first, start position, the valve body 46 obstructs the secondary outlet bores 70 such that no fuel flows through the housing secondary outlet 54 to the secondary system 24. This ensures that all of the fuel flow from the fuel pump 26 at start-up is directed to the HMU 16 until the gas turbine engine 18 reaches a predefined speed, which corresponds to a predefined output of the fuel pump 26. In this example, the secondary flow lockout valve 12 is in the first, start position at about 0 pounds per hour (pph) to about 900 pounds per hour (pph) and at about 0% to about 25% of the total speed of the gas turbine engine 18.

Once the flow from the fuel pump 26 exceeds a predefined amount, such as 900 pounds per hour (pph) for example, the fluid force Fp1 starts to overcome the combined sum of fluid force Fp2 and the spring force Fs. As the fluid force Fp1 overcomes the combined sum of fluid force Fp2 and spring force Fs, the valve body 46 moves toward the second, parked position. With reference to FIG. 2, the valve body 46 is shown in a third, intermediate position. In the third, intermediate position, the fluid force Fp1 is not greater than the combined sum of fluid force Fp2 and spring force Fs such that the valve body 46 is located between the first, start position and the second, parked position. As shown in FIG. 2, the valve body 46 has moved such that the secondary outlet bores 70 are almost unobstructed by the valve body 46 or are almost open. As the fluid force Fp1 continues to increase, the biasing member 48 is further compressed and the valve body 46 continues to move toward the cover 44. As the valve body 46 moves toward the cover 44, the secondary body bores 108 become fluidly coupled to or in fluid communication with the secondary outlet bores 70 such that fuel is provided to the housing secondary outlet 54 and in turn, to the secondary system 24. Thus, the movement of the valve body 46 toward the cover 44 based on the pressure imbalance between third channel 146 and the chamber 80 opens the secondary outlet bores 70. Generally, the secondary outlet bores 70 are unobstructed by the valve housing 40 or opened to enable fuel flow through the housing secondary outlet 54 at about 25% to about 80% of a total speed of the gas turbine engine 18.

With reference to FIG. 4, the secondary flow lockout valve 12 is shown in the second, parked position. In the second, parked position, the fuel pump 26 output is about 3000 pounds per hour (pph) to about 4000 pounds per hour (pph) at about 80% to about 100% of the total speed of the gas turbine engine 18. Generally, in the second, parked position, the gas turbine engine 18 is at about 80% to about 90% of the total speed of the gas turbine engine 18 and the secondary flow lockout valve 12 generally reaches the second, parked position prior to the total speed of the gas turbine engine 18. At this high pump flow, the fluid force Fp1 has overcome the combined sum of fluid force Fp2 and the spring force Fs, such that the valve body 46 has moved into contact with the stop surface 88b defined on the cover 44. With the valve body 46 stopped or parked against the stop surface 88b of the cover 44, both the primary body bores 106 and the secondary body bores 108 are fluidly coupled to the primary outlet bores 68 and the secondary outlet bores 70, respectively. The primary outlet bores 68 and the secondary outlet bores 70 are respectively coupled to the housing primary outlet 52 and the housing secondary outlet 54. Thus, in the second, parked position, the secondary flow lockout valve 12 provides fuel to both the HMU 16 (FIG. 1) and the secondary system 24 (FIG. 1). In addition, in the second, parked position, the fuel is received at the third channel 146 and flows through the third channel 146 into the pressure bores 72. From pressure bores 72, the fuel flows into the housing primary outlet 52. The flow of fuel into the housing primary outlet 52 from the pressure bores 72 reduces a pressure drop at the housing primary outlet 52 from the fuel also being supplied to the housing secondary outlet 54. In one example, the pressure bores 72 reduce the pressure drop by about 20 to 25 pounds per square inch (psi).

Thus, with reference to FIG. 1, the secondary flow lockout valve 12 associated with the fuel system 10 ensures that the fuel flow from the fuel pump 26 is provided to the HMU 16 during a start-up of the gas turbine engine 18. Once the gas turbine engine 18 reaches about 25% power, which results in a corresponding increase in output by the fuel pump 26, with reference to FIG. 2, the fluid force Fp1 overcomes the combined sum of fluid force Fp2 and the spring force Fs, which moves the valve body 46 from the first, start position (FIG. 3) toward the second, parked position (FIG. 4). As the speed of the gas turbine engine 18 increases, the continued increase in fuel flow from the fuel pump 26 causes the valve body 46 to move, which fluidly couples the secondary body bores 108 to the secondary outlet bores 70 and the secondary outlet bores 70 to the housing secondary outlet 54 to provide fuel to the secondary system 24 (FIG. 1). Thus, with reference back to FIG. 1, the secondary flow lockout valve 12 prioritizes the flow of fuel to the HMU 16 over the flow of fuel to the secondary system 24, and provides fuel to the secondary system 24 once the pressure of the fuel flow to the HMU 16 is greater than a predefined threshold, in this example, about 900 pounds per hour. This ensures that the gas turbine engine 18 receives enough fuel to start. Thus, the secondary flow lockout valve 12 is actuated to move from the first, start position to the second, parked position based solely on the flow to the HMU 16, and not based on flow to the secondary system 24. As the gas turbine engine 18 continues to increase in speed, the fuel output by the fuel pump 26 increases, which increases the fuel pressure in the pressure channel 105, thereby moving the valve body 46 into contact with the stop surface 89 and the secondary flow lockout valve 12 to the second, parked position. In the second, parked position, the fuel flow from the fuel pump 26 is provided to both of the HMU 16 and the secondary system 24. In addition, the secondary flow lockout valve 12, which prioritizes flow to the HMU 16 over the flow of fuel to the secondary system 24, minimizes pump size, pump weight and pump power consumption, while also minimizing fuel system heat rise.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A secondary flow lockout valve for a gas turbine engine, comprising:
a valve body having an annular outer wall including a first end that defines an inlet configured to receive a fluid and a second end, the valve body including at least one primary outlet bore and at least one secondary outlet bore defined between the first end and the second end, the first end separated from the second end by an internal wall fixed to the annular outer wall, the valve body defining a channel through the internal wall inward of the annular outer wall in fluid communication with the at least one primary outlet bore; and
a cover that cooperates with the second end of the valve body to define a chamber, the chamber in fluid communication with the channel such that the valve body is movable between at least a first position in which the at least one primary outlet bore is open and a second position in which both the at least one primary outlet bore and the at least one secondary outlet bore are open based on a pressure in the chamber.

2. The secondary flow lockout valve of claim 1, further comprising a biasing member disposed in the chamber, and the biasing member biases the valve body in the first position.

3. The secondary flow lockout valve of claim 2, further comprising at least one force adjusting shim coupled to the cover to adjust a force applied by the biasing member.

4. The secondary flow lockout valve of claim 1, further comprising a valve sleeve coupled to the cover, the valve body received within the valve sleeve and the valve body is movable relative to the valve sleeve and the cover based on the pressure in the channel.

5. The secondary flow lockout valve of claim 4, further comprising a valve housing, the valve sleeve and the cover received within the valve housing, the valve housing defining a housing inlet configured to receive the fluid and in fluid communication with the inlet of the valve body, a housing primary outlet in fluid communication with the at least one primary outlet bore and a housing secondary outlet in fluid communication with the secondary outlet bore based on the position of the valve body.

6. The secondary flow lockout valve of claim 5, wherein the valve sleeve defines at least one pressure bore, and the at least one pressure bore is configured to fluidly couple the inlet to the housing primary outlet based on the position of the valve body.

7. The secondary flow lockout valve of claim 6, wherein the at least one pressure bore is configured to fluidly couple the inlet to the housing primary outlet in the second position.

8. The secondary flow lockout valve of claim 5, wherein the housing primary outlet has a diameter that is different than the housing secondary outlet.

9. The secondary flow lockout valve of claim 5, wherein an outer perimeter of the valve sleeve includes a plurality of sealing members spaced apart along the valve sleeve to fluidly isolate the housing primary outlet from the housing secondary outlet.

10. The secondary flow lockout valve of claim 4, wherein the valve sleeve includes at least one primary sleeve outlet bore in fluid communication with the at least one primary outlet bore, and at least one secondary sleeve outlet bore in fluid communication with the at least one secondary outlet bore based on the position of the valve body.

11. The secondary flow lockout valve of claim 1, wherein an outer perimeter of the valve body defines a primary outlet manifold and a secondary outlet manifold, and the primary outlet manifold and the secondary outlet manifold comprise channels recessed into the outer perimeter.

12. The secondary flow lockout valve of claim 1, wherein the valve body includes a fluid chamber in fluid communication with the inlet and a second internal wall, the fluid chamber including a first portion and a second portion, the at least one primary outlet bore defined in the first portion, the at least one secondary outlet bore defined in the second portion, and the second internal wall extends radially into the second portion such that the second portion has a second diameter that is different than a first diameter of the first portion.

13. The secondary flow lockout valve of claim 12, wherein the channel extends within the second internal wall.

14. The secondary flow lockout valve of claim 1, further comprising a single pressure inlet bore defined through the valve body from an outer circumference of the valve body to the channel, and the pressure inlet bore is configured to provide restrictive fluid flow damping to the chamber.

15. A fuel system for a gas turbine engine, comprising:
a fuel pump configured to provide a fuel;
a secondary flow lockout valve downstream from the fuel pump, the secondary flow lockout valve including:
a valve sleeve that defines at least one primary sleeve outlet bore and at least one secondary sleeve outlet bore downstream from the at least one primary sleeve outlet bore;
a valve body movable within the valve sleeve, the valve body having an annular outer wall including a first end that defines an inlet configured to receive the fuel and a second end, the valve body including at least one primary outlet bore downstream from at least one secondary outlet bore, the first end separated from the second end by an internal wall, the valve body defining a channel through the internal wall inward of the annular outer wall in fluid communication with the at least one primary outlet bore; and
a cover coupled to the valve sleeve that cooperates with the second end of the valve body to define a chamber, the valve body movable relative to the cover, the chamber in fluid communication with the channel such that the valve body is movable relative to the valve sleeve and the cover between at least a first position in which the at least one primary outlet bore is open and a second position in which both the at least one primary outlet bore and the at least one secondary outlet bore are open based on a pressure in the chamber.

16. The fuel system of claim 15, further comprising a biasing member disposed in the chamber, and the biasing member biases the valve body in the first position.

17. The fuel system of claim 15, further comprising a valve housing, the valve sleeve and the cover received within the valve housing, the valve housing defining a housing inlet configured to receive the fluid and in fluid communication with the inlet of the valve body, a housing primary outlet in fluid communication with the at least one primary sleeve outlet bore and a housing secondary outlet in fluid communication with the secondary sleeve outlet bore based on the position of the valve body.

18. The fuel system of claim 17, wherein the valve sleeve defines at least one pressure bore, the at least one pressure bore is configured to fluidly couple the inlet to the housing primary outlet based on the position of the valve body and the at least one pressure bore is configured to fluidly couple the inlet to the housing primary outlet in the second position.

19. The fuel system of claim 15, wherein the valve body includes a fluid chamber in fluid communication with the inlet and a second internal wall, the fluid chamber including a first portion and a second portion, the at least one primary outlet bore defined in the first portion, the at least one secondary outlet bore defined in the second portion, the internal wall extends radially into the second portion such that the second portion has a second diameter that is different than a first diameter of the first portion and the channel extends within the second internal wall.

20. A fuel system for a gas turbine engine, comprising:
a fuel pump configured to provide a fuel;
a secondary flow lockout valve downstream from the fuel pump, the secondary flow lockout valve including:
a valve sleeve that defines at least one primary sleeve outlet bore and at least one secondary sleeve outlet bore downstream from the at least one primary sleeve outlet bore;
a valve body movable within the valve sleeve, the valve body having an annular outer wall including a first end that defines an inlet configured to receive the fuel and a second end, the valve body including at least one primary outlet bore downstream from at least one secondary outlet bore, the valve body includes a fluid chamber in fluid communication with the inlet and an internal wall, the fluid chamber including a first portion and a second portion, the at least one primary outlet bore defined in the first portion, the at least one secondary outlet bore defined in the second portion, the internal wall extends radially into the second portion such that the second portion has a second diameter that is different than a first diameter of the first portion, the valve body defining a channel through the internal wall inward of the annular outer wall in fluid communication with the at least one primary outlet bore;
a cover coupled to the valve sleeve that cooperates with the second end of the valve body to define a chamber, the valve body movable relative to the cover, the chamber in fluid communication with the channel such that the valve body is movable relative to the valve sleeve and the cover between at least a first position in which the at least one primary outlet bore is open and a second position in which both the at least one primary outlet bore and the at least one secondary outlet bore are open based on a pressure in the chamber; and
a valve housing that defines a housing inlet configured to be in fluid communication with the fuel pump, a housing primary outlet in fluid communication with the at least one primary sleeve outlet bore and a housing secondary outlet in fluid communication with the at least one secondary sleeve outlet bore, and the valve sleeve and the cover are received within the valve housing.

* * * * *